United States Patent
Tokida et al.

(10) Patent No.: US 7,414,799 B2
(45) Date of Patent: Aug. 19, 2008

(54) MANUFACTURING METHOD OF CAMERA MODULE

(75) Inventors: Masakuni Tokida, Nagano (JP); Takahiro Kamakura, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 58 days.

(21) Appl. No.: 11/311,781

(22) Filed: Dec. 19, 2005

(65) Prior Publication Data

US 2006/0132935 A1    Jun. 22, 2006

(30) Foreign Application Priority Data

Dec. 20, 2004    (JP) .............................. 2004-366997

(51) Int. Cl.
*G02B 7/02*    (2006.01)
*G03B 17/00*    (2006.01)

(52) U.S. Cl. .......................... 359/811; 359/819; 396/74

(58) Field of Classification Search ......... 359/811–813, 359/818, 819, 822, 823, 825–830; 396/73, 396/74, 77, 95
See application file for complete search history.

(56) References Cited

U.S. PATENT DOCUMENTS

| | | | | |
|---|---|---|---|---|
| 4,307,950 A | * | 12/1981 | Suzuki et al. | ............... 396/144 |
| 4,491,396 A | * | 1/1985 | Isobe et al. | ................. 359/698 |
| 4,506,952 A | * | 3/1985 | Grollimund | ................. 359/823 |

FOREIGN PATENT DOCUMENTS

| | | |
|---|---|---|
| JP | 8-271782 | 10/1996 |
| JP | 2003-60177 | 2/2003 |
| JP | 2004-147032 | 5/2004 |

* cited by examiner

*Primary Examiner*—M. Hasan
(74) *Attorney, Agent, or Firm*—Rankin, Hill, Porter & Clark LLP

(57) ABSTRACT

A lens holder, which supports a light receiving lens, is screwed into a barrel portion of a body holder by respectively engaging hooks, which are provided in a screwing piece, with engaging-grooves formed in an end surface of the lens holder and then rotating the screwing piece. The screwing position of the lens holder is controlled so that the rotational direction position of a set of the engaging grooves is coincided with a reference position of an adjusting piece. Subsequently, the adjusting piece is engaged with the lens holder at the reference position. Then, a focus adjustment is performed by rotating the lens holder in a positive rotation direction.

1 Claim, 5 Drawing Sheets

MANUFACTURING METHOD OF CAMERA MODULE

This application claims foreign priority based on Japanese patent application JP 2004-366997, filed on Dec. 20, 2004, the content of which is incorporated herein by reference in its entirety.

BACKGROUND OF THE INVENTION

1. Field of the Invention

The present invention relates to a manufacturing method of a camera module for use in an image pickup apparatus or the like.

2. Description of the Related Art

Variously configured products of an image pickup module, on which an image pickup element such as a CCD or a CMOS is mounted, have been provided (see, for example, JP-A-2003-60177, JP-A-2004-147032 and JP-A-08-271782). FIGS. 1A and 1B show an example of a camera module assembled by screwing a lens holder 11, which holds a light receiving lens 12, into a barrel portion 10a of a body holder 10. This camera module is assembled as follows. That is, first, an infrared ray cut glass filter 13 is attached to the inner surface of the casing portion 10b so as to seal an opening hole 10c of the barrel portion 10a. Thereafter, a substrate 20, on which an image pickup element 21 is mounted, is bonded to an opening end surface of the casing portion 10b with an adhesive.

Incidentally, a lens holder 11 is screwed into the barrel portion 10a of the body holder 10 through a spacer 14 made of silicon rubber. A stopper portion 10d is provided on the inner peripheral surface of the barrel portion 10a, which is connected to the casing portion 10b. The spacer 14 is mounted in the barrel portion 10a by being sandwiched between end surfaces of the stopper portion 10d and the lens holder 11. The spacer 14 is used to prevent the lens holder 11 from turning in a state in which the lens holder 11 is screwed into the barrel portion 10a, and also used to hold the lens holder 11, that is, the light receiving lens 12 at a predetermined focus position.

In the aforementioned camera module assembled by screwing the lens holder 11 into the barrel portion 10a, in order to correctly place the light receiving lens 12 at the focus position, the lens holder 11 having been being screwed into the barrel portion 10a is turned around an axis thereof to adjust the position in the direction of an optical axis of the lens holder 11. Thus, an adjusting operation of positioning the light receiving lens 12 at the focus position is performed.

FIG. 2 illustrates a manner in which focus adjustment is performed by turning the lens holder 11, which mounted in the barrel portion 10a, through the used of an adjusting piece 30 for focus adjustment. A light receiving penetration hole 11a is provided in a central portion of an end surface 110 of the lens holder 11. Engaging grooves 11b are provided at four places around the penetration hole 11a by being disposed at uniform circumferential intervals. Hooks 31 to be respectively caught by the engaging grooves 11b are provided at four places in the adjusting piece 30 by being disposed at uniform circumferential intervals, similarly to the engaging grooves 11b. Thus, the hooks 31 are engaged with the engaging grooves 11b, respectively, and the adjusting piece 30 is turned. Consequently, the focus adjustment can be performed.

Meanwhile, in order to check whether or not the spacer 14 is correctly mounted in the barrel portion 10a, the following checking operation is performed in the camera module shown in FIGS. 1A and 1B also as an operation of screwing the lens holder 11. That is, when an operation of screwing the lens holder 11 into the barrel portion 10a, the screwing operation is stopped at a moment at which a predetermined amount of torque acts thereon. Then, the height of an end surface 110 of the lens holder 11 (that is, the position of the sunk lens holder 11) at that time is checked to inspect whether or not the spacer 14 is mounted in the barrel portion 10a.

In the operation of checking whether this spacer 14 is mounted in the barrel portion 10a, the screwing of the lens-holder 11 is stopped by detecting the value of turning-torque of the lens holder 11. Thus, the position (in the direction of rotation of the lens holder 11), at which the lens holder 11 is stopped, varies according to variation in the quality of the product.

Incidentally, an operation of screwing the lens holder 11 into the barrel portion 10a is performed by using a screwing piece provided with hooks, which is slimier to the adjusting piece 30. FIGS. 3A to 3D illustrate an example of a case where the lens holder 11 stops in a state, in which the lens holder 11 is screwed into the barrel portion 10a, and in which the position in the direction of rotation of the lens holder 11 changes variously.

Because the position in the direction of rotation of the lens holder 11 changes variously, in the focus adjustment operation of the lens holder 11, first, the adjusting piece 30 is once rotated (about 90 degrees or more) in a direction opposite to a screwing direction. Then, the hooks 31 are engaged with the engaging grooves 11b. Also, the lens holder 11 is slightly turned in a direction in which the lens holder 11 is loosened. Subsequently, the focus adjustment is performed by rotating the lens holder 11 in a screwing direction (a positive rotation direction). The reasons for rotating the lens holder 11 in the positive rotation direction after the adjusting piece 30 is reversely rotated are that the hooks 31 of the adjusting piece 30 are surely engaged with the engaging grooves 11b, and that the lens holder 11 passes through a focus point and the focus adjustment cannot appropriately be achieved in a case where the lens holder 11 is rotated in a screwing direction from the beginning.

Thus, in the related-art process of assembling a camera module, at the focus adjustment, the adjusting piece 30 is once reversely rotated to thereby slightly loosen the lens holder 11. Then, the position of the lens holder 11 is adjusted to the focus point. Therefore, an operation of turning the adjusting piece 30 is made to be cumbersome. Consequently, the related-art method has a drawback in that the productivity of the camera module is reduced.

SUMMARY OF THE INVENTION

An object of the invention is to provide a manufacturing method of a camera module, which is enabled to enhance the productivity of the camera module by promoting the efficiency of especially, a step of assembling the lens holder 11 to the body holder 10 by performing focus adjustment in a process of manufacturing the camera module.

To achieve the foregoing object of the invention, according to the invention, there is provided a manufacturing method of a camera module (hereunder referred to as a first manufacturing method of the invention), in which a lens holder supporting a light receiving lens is screwed into a barrel portion of a body holder by engaging a hook provided in a screwing piece with an engaging-groove formed in an end surface of the lens holder, and in which a hook of an adjusting piece used to per-form focus adjustment is subsequently engaged with the engaging-groove, and the adjusting piece is turned to adjust a position of the light receiving lens to a focus position.

The first manufacturing method of the invention features that when the lens holder is screwed into the barrel portion by using the screwing piece, a screwing position of the lens holder is controlled so that a rotation-direction position of the engaging groove formed in the end surface of the lens holder coincides with a reference position of the adjusting piece. The first manufacturing method of the invention also features that in an operation of the focus adjustment, the adjusting piece is engaged with the lens holder at the reference position, and the lens holder is then rotated in a positive rotation direction to perform focus adjustment.

Further, an embodiment (hereunder referred to as a second manufacturing method of the invention) of the first manufacturing method of the invention features that when the lens holder is screwed into the barrel portion, a spacer is interposed between an end surface of a stopper portion provided on an inner periphery of the barrel portion and an end surface of the lens holder, and an operation of screwing the lens holder is stopped when torque used to turn the lens holder by using the screwing piece reaches a predetermined torque value. The second manufacturing method of the invention also features that presence or absence of the spacer is detected by detecting a position, at which the lens holder is mounted in the barrel portion, at a moment when the operation of screwing the lens holder is stopped.

Furthermore, an embodiment of the second manufacturing method of the invention features that after the presence or the absence of the spacer is detected, the screwing piece is turned in a negative rotation direction to adjust the rotation-direction position of the engaging groove formed in the lens holder to the reference position of the adjusting piece.

The manufacturing method of the camera module according to the invention enables efficient assembling of the lens holder to the body holder when the camera module is assembled by screwing the lens holder, which supports the light receiving lens, into the body holder of the camera module and by adjusting the position of the light receiving lens to the focus position. Also, the lens holder can highly accurately be mounted in the body holder. Consequently, the productivity of the camera module can be enhanced.

DETAILED DESCRIPTION OF THE INVENTION

Hereinafter, a preferred embodiment of the invention is described in detail with reference to the accompanying drawings.

Figure 1A:
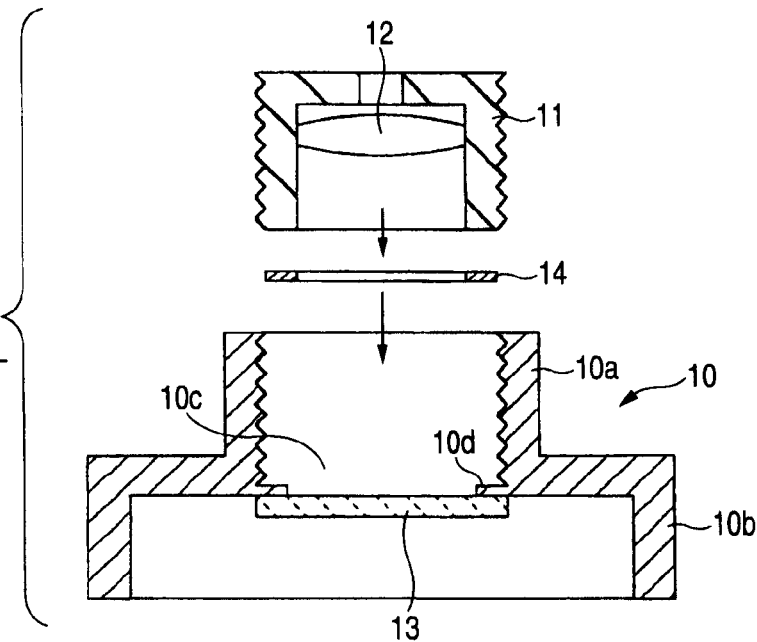
FIGS. 1A and 1B are explanatory views illustrating an assembling method of a camera module.
Figure 1B:
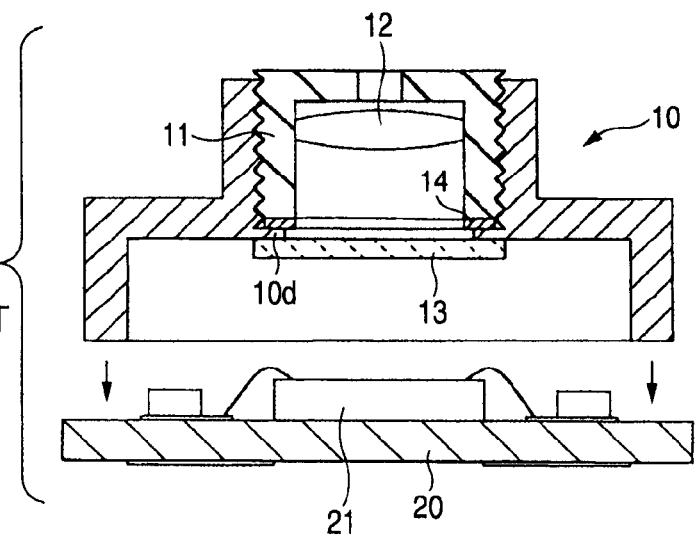
Figure 2:
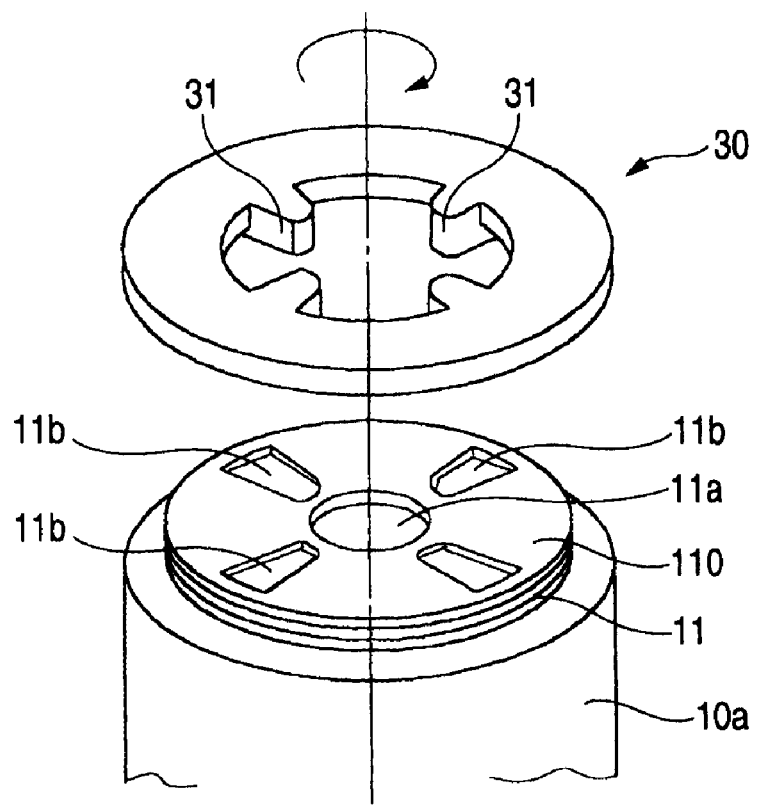
FIG. 2 is a perspective view illustrating a focus adjustment method using an adjusting piece.
Figure 4:
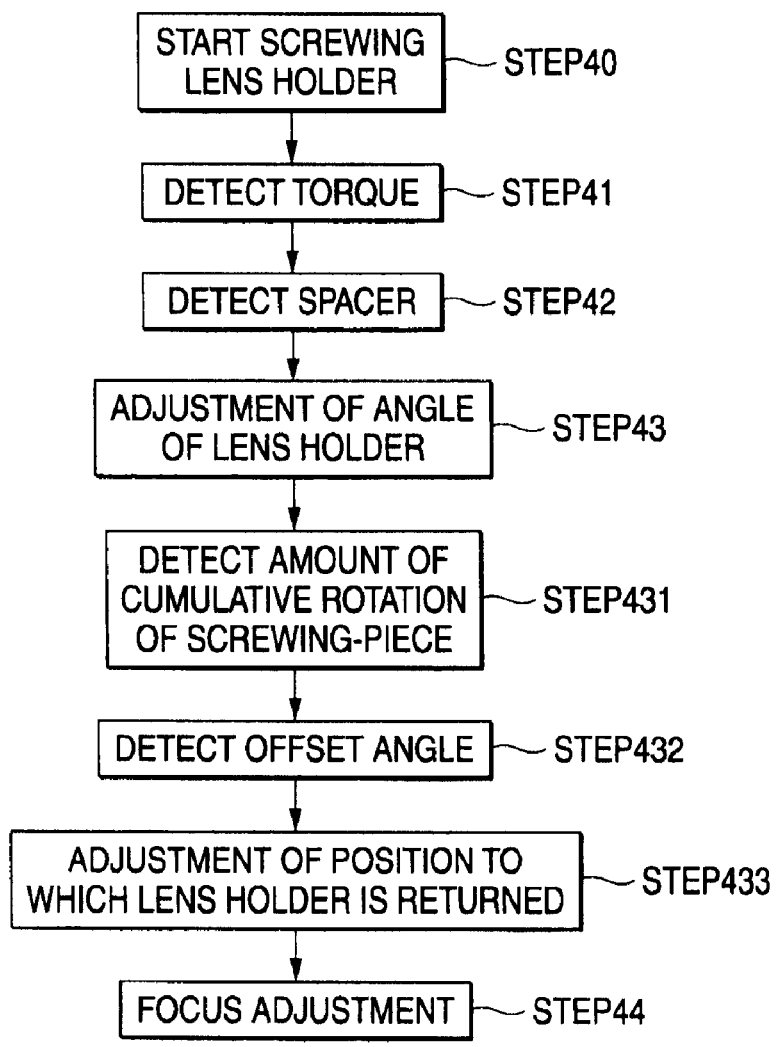
FIG. 4 is a flowchart illustrating a manufacturing process of assembling the lens holder to a body holder.

FIG. 4 is a flowchart illustrating a manufacturing process of assembling a lens holder 11 to a body holder 10, which process is a feature of the manufacturing method of a camera module according to the invention. Incidentally, the configuration of the camera module assembled in this embodiment is the same as that of the camera module shown in FIGS. 1A and 1B. Therefore, the description of the configuration of the camera module is omitted herein.

Figure 5:
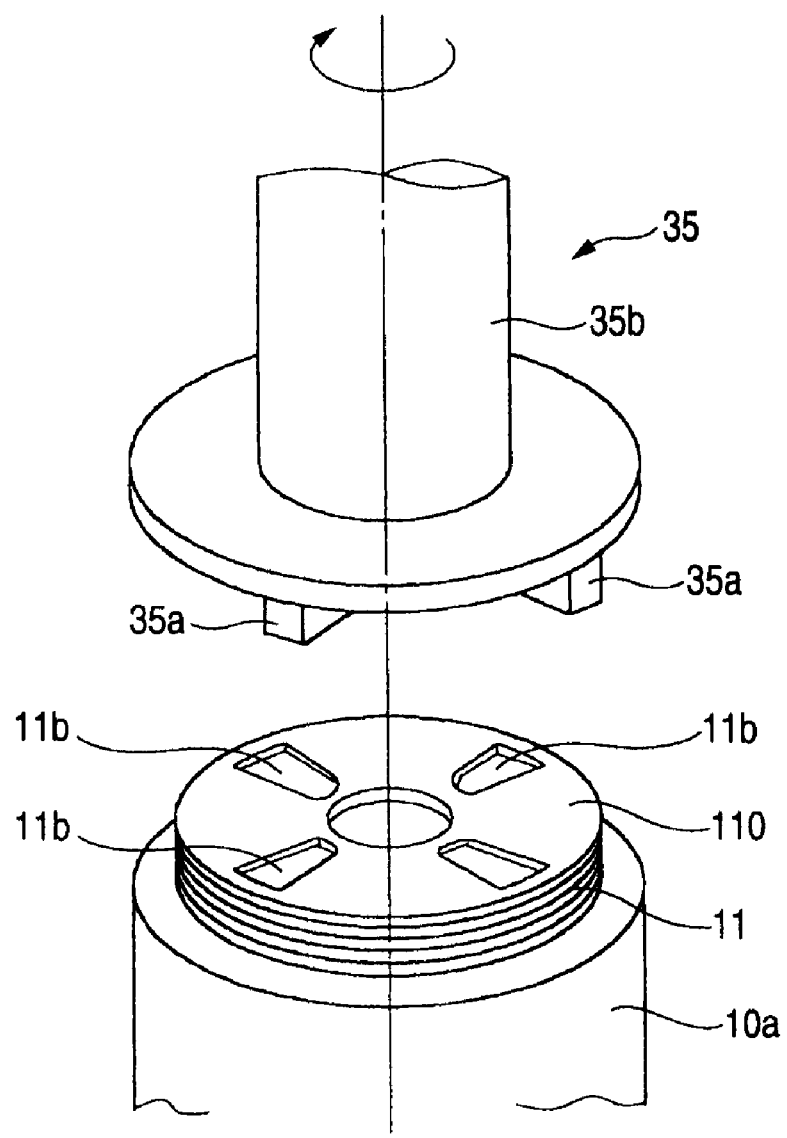
FIG. 5 is a perspective view illustrating a screwing operation using a screwing piece.

FIG. 5 illustrates a method of screwing the lens holder 11 into the body holder 10 by using a screwing piece 35.

When the lens holder 11 is assembled to the barrel portion 10a of the body holder 10, the screwing piece 35 is made to face an end surface 110 of the lens holder 11. Then, the screwing piece 35 is rotated by gradually being brought closer to the end surface 110. Thus, hooks 35a of the screwing piece 35 are engaged with engaging-grooves 11b formed in the end surface 110, respectively. Subsequently, the lens holder 11 is rotated together with the screwing piece 35 to start screwing the lens holder 11 into the barrel portion 10a in step 40.

When the screwing piece 35 is rotated, a slight slippage initially occurs. However, the hooks 35a are engaged with the engaging grooves 11b, respectively, halfway through the rotation. Thus, the screwing piece 35 and the lens holder 11 are integrally rotated, so that the lens holder 11 is screwed into the barrel portion 10a.

A turning mechanism (not shown) adapted to cause positive or negative rotation of the screwing piece 35 is provided on a support shaft 35b of the screwing piece 35. Also, a torque detecting means, which is adapted to detect torque produced by turning the screwing piece 35, and a rotation detecting means, such as an encoder adapted to detect an amount of rotation of the screwing piece 35, are provided on the support shaft 35b of the screwing piece 35. The direction, the amount, and the ON/OFF of rotation of the screwing piece 35, which is caused by the turning mechanism, are controlled by the control portion.

The operation of screwing the lens holder 11 into the barrel portion 10a by using the screwing piece 35 is stopped when the torque rotating the lens holder 11 reaches a predetermined value, in step 41. The spacer 14 is interposed between the end surfaces of the body holder 10 and the lens holder 11. Thus, when the lens holder 11 is screwed thereinto and the end surface of the lens holder 11 tightens the spacer 14, torque used to screw the lens holder 11 increases. The operation of turning the screwing piece 35 is controlled by the control portion according to a result of detection performed by the torque detecting means that is provided by being coupled to the screwing piece 35.

Incidentally, in a case where the spacer 14 is not interposed therebetween, torque is generated in a state in which the lens holder 11 abuts against the base part of the barrel portion 10a (that is, a state in which the lens holder 11 is sunk in the barrel portion 10a). Therefore, the interposition of the spacer 14 between the end surfaces of the body holder 10 and the lens holder 11 is detected by detecting the height position of the lens holder 11 (the position of the end surface of the lens holder 11) when torque used to turn the lens holder 11 reaches a certain value. That is, in step 42, the presence/absence of the spacer 14 is detected by detecting the height of the lens holder 11.

In a case where it is decided in step 42 that the spacer 14 is not interposed therebetween, the work is excluded in this step.

In step 43, a turning-angle adjustment operation of turning the lens holder 11 around an axis line to return the lens holder 11 to a reference position is performed on the work, which is determined in step 42 to have a spacer 14 interposed therebetween. This turning-angle adjustment operation is performed to enable an adjusting piece 30, which is used to adjust a focus position of the light receiving lens 12 in the subsequent step, to be operated by engaging the hooks 31 with the engaging grooves 11b of the lens holder 11 without performing a negative rotation operation needed in the related-art camera module.

That is, in a state in which the lens holder 11 is screwed into the barrel portion 10a, the lens holder 11 is placed at various rotation-direction positions as shown in FIGS. 3A to 3D. In this invention, whichever rotation-direction position the lens holder stops at, the position of the lens holder 11 is adjusted to the reference position (an initial position at which the adjusting piece 30 starts rotating in a focus adjustment operation) of the adjusting piece 30. Thus, in the focus adjustment operation, the lens holder 11 is immediately rotated in a screwing direction (a positive rotation direction), without performing a negative rotation operation, only by preliminarily setting the adjusting piece 30 at the reference position. Consequently, the focus adjustment can be achieved.

Incidentally, when the position of the lens holder 11 is adjusted to the reference position of the adjusting piece 30, it is necessary that the adjustment of the position is set to be performed by rotating the lens holder 11 in a returning direction (a loosening direction) to prevent the lens holder 11 from passing through the focus point.

A rotating angle (an offset angle) $\underline{b}$ of the lens holder 11 in a case, in which the lens holder 11 is return-rotated to adjust the position thereof to the reference position of the adjusting piece 30, is determined as follows.

As illustrated in FIGS. 3A to 3D, let $\underline{a}$ denote an amount of cumulative rotation (cumulative rotation angle from the start of rotation to the end thereof) of the screwing piece 35 in a case where the lens holder 11 is screwed by using the screwing piece 35. Let $\underline{b}$ designate an offset angle set to return the lens holder 11 to the reference position of the adjusting piece 30. In consideration of the fact that the engaging grooves 11b are circumferentially disposed at angular intervals of 90 degrees in the lens holder 11, the following equation holds.

$$(\underline{a}-\underline{b})=90\times n$$

where n is a natural number. The cumulative rotation angle $\underline{a}$ can be determined by an encoder as an amount of rotation of the screwing piece 35. Therefore, the offset angle b of the lens holder 11 can be obtained by the following equation under the condition that n is a maximum natural number.

$$\underline{b}=\underline{a}-90\times n.$$

Figure 3A:
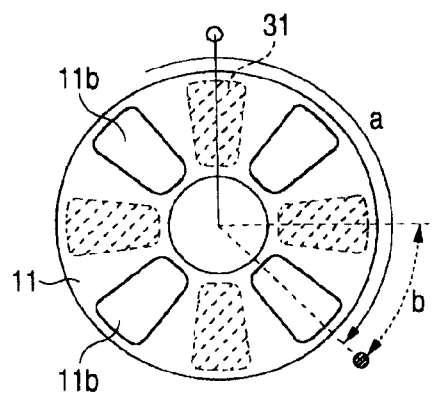
FIGS. 3A to 3D are explanatory views illustrating an example of placement of a lens holder in a state in which the lens holder is being screwed into a barrel portion.
Figure 3B:
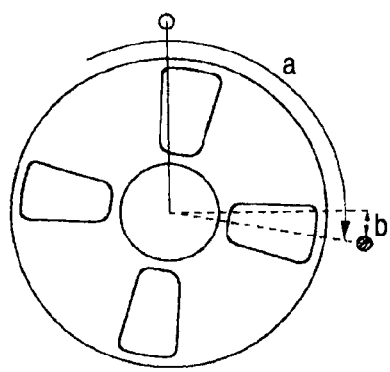
Figure 3C:
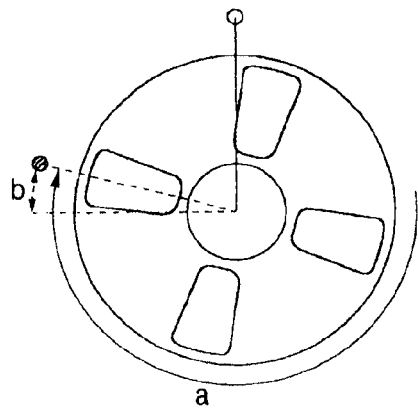
Figure 3D:
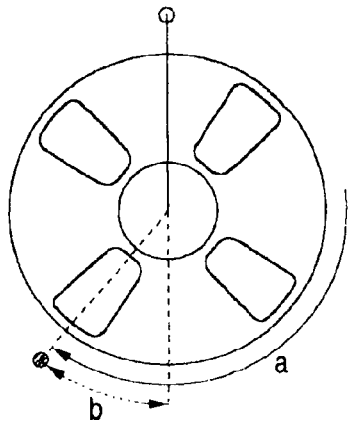

FIG. 3A shows the position of the lens holder 11 at a moment, at which the spacer is detected in step 42, and also shows the arrangement of the hooks 31 in the reference position of the adjusting piece 30. As can be understood from this figure, the positions of the engaging grooves 11b can be made to coincide with those of the hooks 31 of the adjusting piece 30, respectively, by rotating the lens holder 11 by the offset angle $\underline{b}$ in a direction opposite to the screwing direction (the positive rotation direction).

The operation of rotating the lens holder 11 by the offset angle $\underline{b}$ in a direction opposite to the screwing direction can actually be performed as an operation of reversely rotating the screwing piece 35 by the rotation angle $\underline{b}$ while the screwing piece 35 is engaged with the lens holder 11, subsequently to the operation of detecting the spacer by screwing the lens holder 11 into the barrel portion 10a through the use of the screwing piece 35.

The control portion detects an amount $\underline{a}$ of cumulative rotation of the screwing piece 35 in step 431. Then, the control portion calculates the offset angle $\underline{b}$ from the amount of the cumulative rotation of the screwing piece 35. Subsequently, the turning mechanism for the screwing piece 35 is controlled according to a result of this detection, so that the screwing piece 35 is rotated by the offset angle $\underline{b}$ in the direction opposite to the screwing direction. Thus, the adjustment of a return position, to which the lens holder is returned, is performed in step 433.

The positions of the engaging grooves 11b are adjusted to those of the hooks 31 shown in FIG. 3A by performing this return position adjustment. Thus, the position of the lens holder 11 is adjusted to the reference position of the adjusting piece 30.

As described above, the operation of adjusting the angle of the lens holder 11 in step 43 is performed according to the method of turning the lens holder 11 in the returning direction (the loosening direction) and adjusting the rotation-direction position of the lens holder 11 to the reference position of the adjusting piece 30. In the subsequent focus adjustment in step 44, the rotation-direction position of the adjusting piece 30 is set at the reference position. The adjusting piece 30 is caused only by performing this setting to face and abut against the lens holder 11. Thus, the hooks 31 of the adjusting piece 30 are engaged with the engaging grooves 11b of the lens holder 11. While this state is maintained, the adjusting piece 30 is caused to perform positive rotations (that is, rotate in the screwing direction of the lens holder 11). Consequently, the focus adjustment of the light receiving lens 12 can be achieved.

Thus, according to the method of assembling the lens holder 11 according to this embodiment, when the lens holder 11 is attached to and is screwed into the barrel portion 10a of the body holder 10, the rotation-direction position of the lens holder 11 is preliminarily adjusted to the reference position of the adjusting piece 30 to be used in the subsequent step. Consequently, the focus adjustment operation can efficiently be performed. In other words, the time needed for rotating the adjusting piece in the negative rotation direction can be omitted and also the hooks of the adjusting piece can be surely engaged with the engaging grooves of the lens holder.

The operation of screwing the lens holder 11 into the barrel portion 10a is performed also as the operation of checking whether the spacer is interposed. The operation of adjusting the rotation-direction position of the lens holder 11 to the reference position of the adjusting piece 30 by slightly turning the lens holder 11 in the returning direction is performed to follow the detection of the spacer, which is performed in step 42, as a part of a sequence of operations. Thus, the operation of adjusting the rotation-direction position of the lens holder 11 to the reference position of the adjusting piece 30 can easily be performed as a part of an operation of screwing the lens holder 11.

Further, in the focus adjustment operation in step 44, the positive rotation of the adjusting piece 30 can immediately be performed only be setting the adjusting piece 30 to the reference position. Thus, the focus adjustment can be achieved. Consequently, the operation of adjusting the focus of the light receiving lens 12 can extremely efficiently be performed.

According to the present embodiment, when the rotation-direction position of the lens holder 11 is adjusted to the reference position of the adjusting piece 30, the lens holder 11 is rotated in the negative direction (the loosening direction) to thereby perform the adjustment of the rotation-position thereof. Thus, at the focus adjustment, the lens holder 11 does not pass through the focus point. Consequently, this embodiment has an advantage in that the focus adjustment can surely be achieved.

Incidentally, the reference position of the adjusting piece 30 (the rotation-direction position from which the adjusting piece 30 starts rotating at the focus adjustment) can appropriately be set. The offset angle b of the lens holder 11 can be determined according to the reference position of the adjusting piece 30.

Additionally, although the engaging grooves 11b are provided in the lens holder 11 by being circumferentially arranged at angular intervals of 90 degrees in the aforementioned embodiment, the circumferential intervals at which the engaging grooves 11b provided in the lens holder 11 can appropriately be selected. For instance, in a case where the engaging grooves 11b are disposed at angular intervals of 60 degrees, the offset angle b is determined by the following equation.

$$b = a - 60 \times n \text{ (}n\text{ is a possible maximum natural number).}$$

Thus, the position of the lens holder 11 can be adjusted to the reference position of the adjusting piece 30.

What is claimed is:

1. A method of manufacturing a camera module comprising: a body holder including a barrel portion, and a lens holder supporting a light receiving lens and including an engaging-groove formed in its end surface, the method comprising steps of:

screwing the lens holder into the barrel portion of the body holder by engaging a hook provided in a screwing piece with the engaging-groove of the lens holder, wherein the lens holder is received in the barrel portion and is in threaded engagement with the barrel portion;

performing a focus adjustment by engaging a hook of an adjusting piece with the engaging-groove of the lens holder at a reference position, and rotating the lens holder in a positive rotation direction by using the adjusting piece to adjust a position of the light receiving lens to a focus position, wherein when the lens holder is screwed into the barrel portion by using the screwing piece, a screwing position of the lens holder is controlled so that a position of the engaging groove of the lens holder coincides with the reference position of the adjusting piece, when the lens holder is screwed into the barrel portion, interposing a spacer between an end surface of a stopper portion provided on an inner periphery of the barrel portion and an end surface of the lens holder;

stopping an operation of screwing the lens holder when torque used to turn the lens holder by using the screwing piece reaches a predetermined torque value;

detecting presence or absence of the spacer by detecting a position, at which the lens holder is mounted in the barrel portion, at a moment when the operation of screwing the lens holder is stopped; and after the presence or the absence of the spacer is detected, turning the screwing piece in a negative rotation direction to adjust the position of the engaging groove of the lens holder to the reference position of the adjusting piece.

* * * * *